United States Patent
Müller

[11] Patent Number: 5,377,956
[45] Date of Patent: Jan. 3, 1995

[54] DIAPHRAGM VALVE

[75] Inventor: Fritz Müller, Ingelfingen, Germany

[73] Assignee: Gebrüder Müller Apparatebau GmbH & Co. KG, Ingelfingen, Germany

[21] Appl. No.: 186,329

[22] Filed: Jan. 24, 1994

[30] Foreign Application Priority Data

Jan. 29, 1993 [DE] Germany .................... 4302556

[51] Int. Cl.$^6$ .................................... F16K 7/16
[52] U.S. Cl. ............................ 251/331; 251/229; 251/265; 251/284; 74/25; 74/89.15; 74/424.8 VA
[58] Field of Search .......... 251/229, 264, 265, 273, 251/274, 331, 335.2, 284; 74/25, 89.15, 424.8 VA

[56] References Cited

U.S. PATENT DOCUMENTS

| | | | |
|---|---|---|---|
| 2,585,667 | 2/1952 | Meador | 251/273 |
| 2,784,934 | 3/1957 | Paulius, Jr. et al. | 251/265 |
| 2,977,981 | 4/1961 | Jarrett | 251/331 |
| 3,148,861 | 9/1964 | McFarland, Jr. | 251/331 |
| 3,631,882 | 1/1972 | White, Jr. | 251/331 |
| 3,633,874 | 1/1972 | Veugelers et al. | 251/331 |
| 4,014,514 | 3/1977 | Priese et al. | 251/331 |
| 4,051,865 | 10/1977 | Cocking et al. | 251/331 |
| 4,505,451 | 3/1985 | Jonas | 251/331 |
| 5,106,055 | 4/1992 | Phillips | 251/264 |
| 5,112,027 | 5/1992 | Hanyu et al. | 251/331 |

FOREIGN PATENT DOCUMENTS

| | | | |
|---|---|---|---|
| 0183342 | 6/1986 | European Pat. Off. | 251/331 |
| 844189 | 7/1939 | France | 251/335.2 |
| 427624 | 11/1947 | Italy | 251/335.2 |
| 2250081 | 5/1992 | United Kingdom | 251/331 |

Primary Examiner—George L. Walton
Attorney, Agent, or Firm—Henry M. Feiereisen

[57] ABSTRACT

A diaphragm valve includes a valve body accommodating an axial valve stem and housing a weir-type valve seat which cooperates with a diaphragm operated by a hand wheel for regulating a flow of fluid through the weir. A screw nut extends axially between the valve body and the hand wheel for limiting a closing lift of the diaphragm by impacting on the valve body. The screw nut is connected in form-fitting manner with the hand wheel so as to follow a displacement of the valve stem when turning the hand wheel for opening and closing of the valve.

6 Claims, 1 Drawing Sheet

DIAPHRAGM VALVE

BACKGROUND OF THE INVENTION

The present invention refers to a diaphragm valve of the type having a closing lift stop and including a diaphragm which is actuated by a hand wheel via a valve stem.

Manually actuated valves provided with diaphragms of elastomer material and lacking any limitation of the valve lift run the risk that high closing forces may destroy the diaphragm during the closing lift, ultimately resulting in a leaky closure of the valve.

It is known to provide valves with a closing lift stop in form of nut and counternut configuration or in form of a slip-clutch. Both these proposals are however very complicated and uneconomical.

SUMMARY OF THE INVENTION

It is an object of the present invention to provide an improved diaphragm valve obviating the afore-stated drawbacks.

In particular, it is an object of the present invention to provide an improved diaphragm valve with adjustable closing lift stop and yet of simple construction.

It is a further object of the present invention to provide an improved diaphragm valve which allows adjustment of the diaphragm in a simple manner.

These objects and others which will become apparent hereinafter are attained in accordance with the present invention by providing a screw nut axially between the valve body and the hand wheel, with the screw nut being threadably engaged on the valve stem and bearing upon the valve body for limiting the valve lift in closing direction.

Suitably, the hand wheel is provided with a downwardly extending annular prolongation to exhibit a bell-shaped configuration for enclosing the screw nut. In the area of the overlapping prolongation, the hand wheel is provided with an internal toothing which is engageable with a complementary external toothing of the screw nut. Preferably, the internal toothing of the prolongation of the hand wheel and the external toothing of the screw nut are shaped in form of a polygon, for example a dodecagon.

BRIEF DESCRIPTION OF THE DRAWING

The above and other objects, features and advantages of the present invention will now be described with reference to the accompanying drawing, in which the sole

DETAILED DESCRIPTION OF A PREFERRED EMBODIMENT

Figure 1:
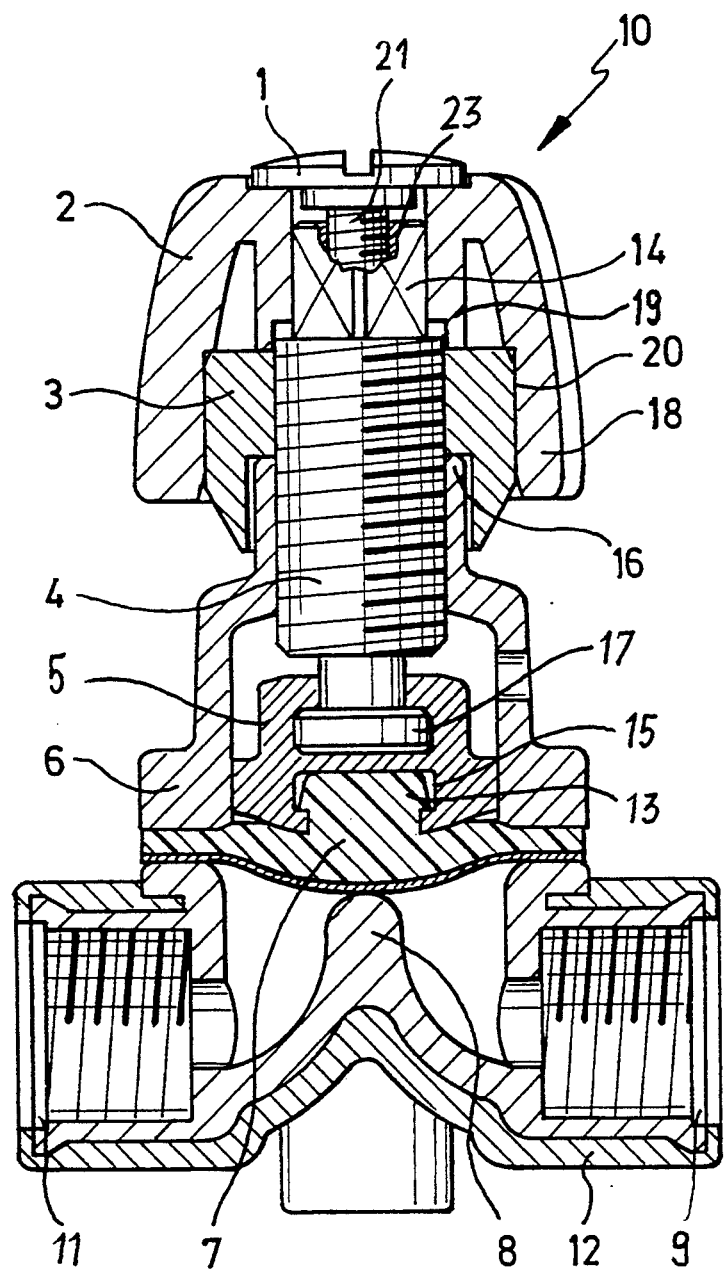
FIG. 1 shows a sectional view through one embodiment of a diaphragm valve according to the present invention.

FIG. 1 shows a sectional view of one embodiment of a diaphragm valve, generally designated by reference numeral 10 and having a valve body in form of a lower body part 12 and an upper body part 6, with the lower body part 12 accommodating inlet and outlet ports 9, 11. Formed inside the lower body part 12 is a weir-type valve seat 8 which cooperates with a diaphragm 7 for regulating the flow of fluid through the valve 10 i.e. between the inlet and outlet ports. The diaphragm 7 is provided at the side distant to the weir 8 with a central T-shaped plug 13 which is received in a complementary recess 15 of a compressor plug 5. Opposite to the recess 15, the compressor plug 5 is provided with a further T-shaped recess for receiving the complementary T-shaped fitting 17 of a valve stem 4. Thus, the compressor plug 5 securely connects the diaphragm 7 with the valve stem 4 and is moved up and down by the valve stem 4 for controlling the position of the diaphragm 7. When the compressor plug 5 is lowered, the diaphragm 7 is pressed tightly against the weir 8, as shown in FIG. 1.

The valve stem 4 extends vertically in the upper body part 6 and extends beyond the upper body part 6 towards the outside for cooperation with a hand wheel 2. Opposite to the fitting 17, the valve stem 4 is provided with a square 14 which is engageable with a complementary square socket 19 of the hand wheel 2. A cap 1 retains the hand wheel 2 in position and is provided with a threaded shaft 21 which is engaged in a complementary bore 23 of the square 14.

The valve stem 4 is provided with an external thread for engagement with the internal thread of the upper body part 6. Sandwiched axially between the upper end 16 of the upper body part 6 and the hand wheel 2 is a limiter in form of a screw nut 3 which is threadably engaged onto the external thread of the valve stem 4.

As stated above, FIG. 1 shows the closing position of the diaphragm valve 10 which means that the compressor 5 is lowered by the valve stem 4 to press tightly the diaphragm 7 against the weir 8, with the screw nut 3 bearing upon the upper end 16 of the upper body part 6. In order to open the diaphragm valve 10, the hand wheel 2 is turned to the left, as viewed from above, so that the valve stem 4 is moved upwards to lift the compressor 5 and thus the diaphragm 7 from the weir 8.

As further shown in FIG. 1, the hand wheel 2 is downwardly extended by an annular prolongation 18 to exhibit a bell-shaped configuration so as to overlap the screw nut 3. The prolongation 18 of the hand wheel 2 is provided with an internal toothing which is in engagement with an external toothing of the screw nut 3, with the external toothing being formed about the outer circumference 20 of the screw nut 3. Suitably, the internal toothing of the prolongation 18 and the external toothing of the screw nut 3 are of polygon configuration, e.g. in form of a dodecagon.

If it is desired to adjust the diaphragm 7, the cap 1 is removed and the hand wheel 2 is separated from the square 14. Subsequently, the screw nut 3 is loosened and moved along the valve stem 4 slightly upwards away form the upper end 16 of the upper body part 6. The hand wheel 2 is then inverted and reattached onto the square 14 of the valve stem 4, with the prolongation 18 now pointing upwardly. In this position of the hand wheel 2, the valve stem 4 together with the compressor 5 and the diaphragm 7 can be moved towards or away from the weir 8 through turning of the hand wheel 2 for readjustment.

After adjusting the diaphragm 7, the screw nut 3 is screwed downwards again along the valve stem 4 until bearing upon the upper end 16 of the upper body part 6. The hand wheel 2 is then removed from the square 14 and inverted to the position as shown in FIG. 1 for attachment onto the square 14, with the prolongation 18 engaging over the screw nut 3 at the same time. In general, the tolerances are sufficient to allow placement of the hand wheel 2 onto the square 14 and simultaneous engagement of the prolongation 18 onto the screw nut 3. If for any reason the attachment of the hand wheel 2 in this manner is not possible, it is sufficient to slightly turn the screw nut 3 before placement of the hand wheel 2.

After placement of the hand wheel 2, the cap 1 is then reattached onto the hand wheel 2 and screwed into the square 14.

When opening or closing the valve 10 through turning of the hand wheel 2, the screw nut 3 follows the displacement of the valve stem 4 since the hand wheel 2 and the screw nut 3 are connected in form-fitting manner. Opening of the valve 10 through respective rotation of the hand wheel 2 results in an upward movement of the valve stem 4 and of the screw nut 3 for raising the diaphragm axially away from the weir 8, with the valve stem 4 rotating within the compressor 5 which thus is moved in axial direction. When turning the hand wheel 2 in opposite direction, the valve 10 is closed again as the valve stem 4 and the screw nut 3 are moved downwards to rest on the weir 8. The downward direction of the valve stem 4 (closing lift) is stopped as soon as the screw nut 3 bears upon the upper end 16 of the upper body part 6. Thus, the impact of the screw nut 3 on the upper end 16 results in a limitation of the closing lift of the valve stem 4 for protection of the diaphragm 7 during closing of the valve 10.

While the invention has been illustrated and described as embodied in a diaphragm valve, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A diaphragm valve, comprising:

a valve body accommodating a valve stem placed axially therein and having an external thread;

a diaphragm connected to said valve stem for regulating a flow of fluid;

an actuator having a portion thereon detachably secured to said valve stem for actuating said diaphragm and having an internal toothing disposed on another portion of said actuator; and a limiter extending axially between said valve body and said actuator for restricting a movement of said valve stem in a closing direction by impacting on said valve body, said limiter including a screw nut threadably engaging with said external thread of said valve stem and said internal toothing of said actuator, with said other portion surrounding a portion of said limiter so that upon actuation of said actuator said valve stem and said limiter are moved in unison relative to movement of said diaphragm between open and closed positions.

2. The diaphragm valve defined in claim 1 wherein said actuator is a hand wheel.

3. The diaphragm valve defined in claim 1 wherein said other portion of said actuator is an annular prolongation for overlapping and at least partially enclosing said limiter in a bell-shaped manner.

4. The diaphragm valve defined in claim 1 wherein said screw nut has an external toothing in mesh with said internal toothing of said actuator.

5. The diaphragm valve defined in claim 4 wherein said internal toothing of said actuator and said external toothing of said limiter are of polygonal configuration.

6. The diaphragm valve defined in claim 5 wherein said internal toothing of said actuator and said external toothing of limiter are shaped in form of a dodecagon.

* * * * *